United States Patent [19]

Justice et al.

[11] Patent Number: 5,087,101
[45] Date of Patent: Feb. 11, 1992

[54] POWER SPIRAL CONVEYOR SECTION AND METHOD

[75] Inventors: James C. Justice; Frank Delli-Gatti, Jr., both of Beckley, W. Va.

[73] Assignee: Coaltex, Inc., Beckley, W. Va.

[21] Appl. No.: 625,440

[22] Filed: Dec. 11, 1990

[51] Int. Cl.$^5$ .................... E21C 35/20; B65G 33/32
[52] U.S. Cl. ........................ 299/18; 198/667; 299/57; 299/68
[58] Field of Search ............ 299/18, 56, 64, 68, 299/87, 57, 67; 198/657, 667, 674; 175/88

[56] References Cited

U.S. PATENT DOCUMENTS

| | | | |
|---|---|---|---|
| 2,103,145 | 12/1937 | Carter | 198/667 |
| 3,036,821 | 5/1962 | Letts | 299/87 X |
| 4,036,529 | 7/1977 | Hawthorne et al. | 299/57 X |
| 4,082,362 | 4/1978 | Justice et al. | 299/57 |
| 4,953,915 | 9/1990 | Jasser et al. | 299/68 X |

FOREIGN PATENT DOCUMENTS

| | | | |
|---|---|---|---|
| 165358 | 1/1953 | Australia | 299/67 |
| 2700999 | 7/1978 | Fed. Rep. of Germany | 198/667 |
| 723111 | 3/1980 | U.S.S.R. | 299/57 |

Primary Examiner—David J. Bagnell
Attorney, Agent, or Firm—Nixon & Vanderhye

[57] ABSTRACT

A spiral conveyor section assembly for a mining machine includes a spiral conveyor mounted by a shaft for rotation about an axis, the shaft having first and second free ends each adapted to be connected to another shaft. A motor, gearing, and like power device effects rotation of the shaft about its axis. The power device is mounted directly in association with the spiral conveyor between the ends of the shaft. The power device has at least about ¼-¾ horsepower for each foot of spiral conveyor (e.g. about 32-36 inches in diameter). A second (or more) spiral conveyor can be provided mounted parallel to the first, with the power device effecting rotation of both, toward each other. A guard is mounted in association with each inner portion of the spiral section to prevent mined material from being flung from one spiral to the other. It is possible to convey mined material 1,000 feet or more utilizing spiral conveyor sections connected end to end.

20 Claims, 2 Drawing Sheets

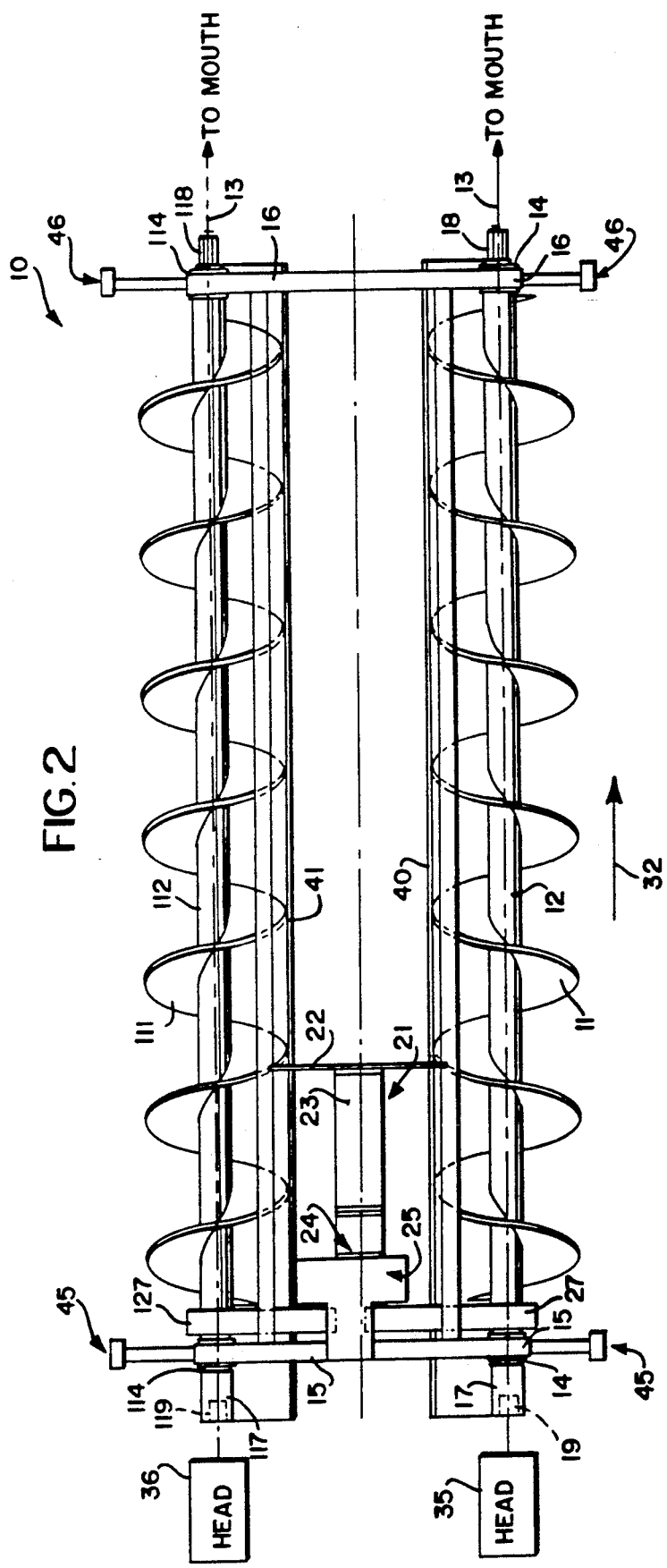

POWER SPIRAL CONVEYOR SECTION AND METHOD

BACKGROUND AND SUMMARY OF THE INVENTION

Powered spiral conveyors are useful in the mining of coal, and other material. For example as shown in U.S. Pat. No. 4,082,362 (the disclosure of which is hereby incorporated by reference herein), a number of spiral conveyor sections can be connected together to effect conveyance of mined material from a cutting site to the mine mouth. While such spiral conveyors are desirable, there is an inherent limitation in the distance that mined material can be transported thereby. If it is desirable to convey the mined material a long distance, e.g. about 1,000 feet, it is impractical to apply enough power to one end of the spiral conveyor section, e.g. at the mine mouth, to effect proper and speedy conveyance of mined material thereby all the way from the cutting site to the mine mouth.

In order to overcome the above mentioned problem, according to the present invention powered spiral conveyor sections are provided. Each conveyor section includes at least one spiral conveyor, and a power source, such as a 100 horsepower motor. The power source drives the spiral associated with that section. Various sections may be interconnected by in-line shaft portions extending therebetween, with support struts provided as necessary. Also, spiral conveyors can be mounted in gangs, for example two spiral conveyor sections may be mounted for a given section with a motor, gear train, and drive chain associated with each of the spiral conveyors. Typically there is at least $\frac{1}{4}-\frac{3}{4}$ horsepower of the power means for driving each foot of spiral conveyor (if its diameter is about 32-36").

The spiral conveyors may be associated with a mining machine including a mining head, with the spiral conveyor means extending from the mining head toward the mine mouth. With power means disposed at periodic intervals along the conveyor means for providing power for rotating the shaft of the spiral, the conveyor may extend about 1,000 feet or more from the mining head to the mine mouth, and still be effectively powered.

According to a method of the present invention, mining of a mine having a mine mouth, using a mining head with a spiral conveyor having a spiral screw rotatable with a shaft about an axis of rotation, is provided. The method comprises the steps of: (a) Inserting the mining head into the mine through the mine mouth, and advancing the head into the mine mouth. (b) Continuously conveying mined material from the mine toward the mine mouth using the spiral conveyor. (c) Adding incremental lengths to the spiral conveyor screw as the distance from the mining head to the mouth increases. And, (d) periodically providing power assists for effecting powered rotation of the spiral conveyor about its axis of rotation along the length of the spiral conveyor in the mine as the incremental lengths are added. Preferably step (d) is practiced so that there is at least about one horsepower of power assist for each foot of spiral screw, and more preferably about two horsepower of power assist for each foot of spiral screw.

It is the primary object of the present invention to provide for the effective conveyance of mined material using a spiral conveyor, over long distances. This and other objects of the invention will become clear from an inspection of the detailed description of the invention, and from the appended claims.

BRIEF DESCRIPTION OF THE DRAWINGS

FIG. 2 is a top plan view of the conveyor section of FIG. 1; and

DETAILED DESCRIPTION OF THE DRAWINGS

Figure 1:
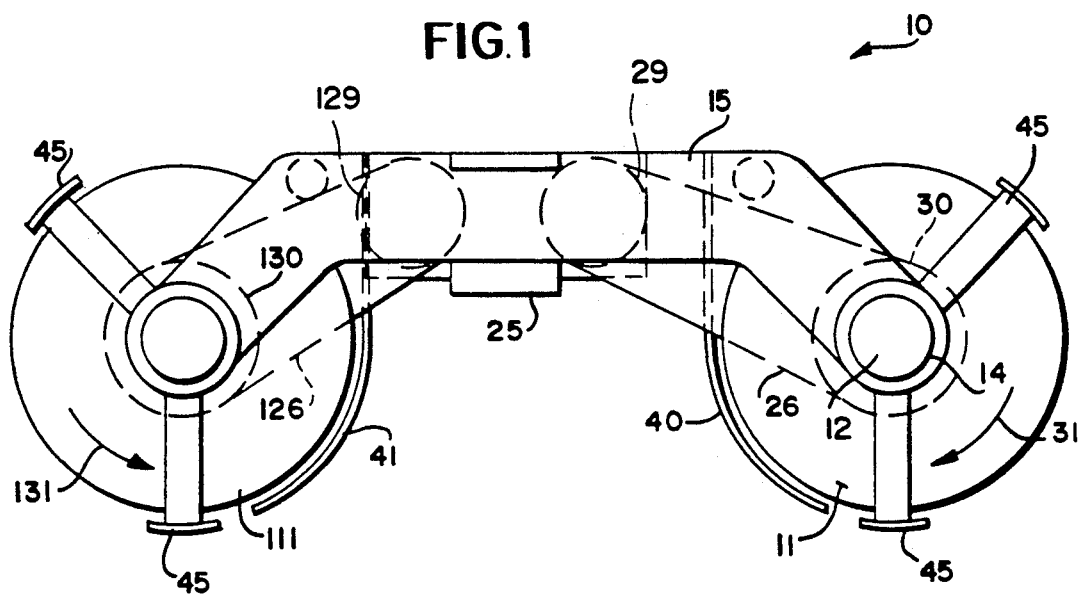
FIG. 1 is a front schematic view of an exemplary spiral conveyor section according to the present invention.

An exemplary spiral conveyor section assembly for a mining machine is shown generally by reference numeral 10 in FIGS. 1 and 2. The assembly 10 includes at least one spiral (screw) conveyor 11 mounted by a shaft 12 for rotation about an axis 13 extending through the center of the dimension of elongation of the shaft 12. The shaft 12 is mounted for rotation about the axis 13 by conventional bearing means 14 provided in support struts 15, 16 at spaced locations along the shaft 12, preferably at the front and rear thereof as illustrated in FIG. 2.

The shaft 12 has a first, preferably leading, free end 17, and a second, preferably trailing, free end 18. The second end 18 has a non-round cross-sectional configuration, e.g a flattened circle, square, octagon, or the like, and the first end 17 includes means defining a central recess 19 therein for receipt of a non-round shaft section 18 of another assembly 10. Of course the recess 19 will have the same cross-sectional configuration as the second end 18. The length of the shaft from the frontmost portion of the first end 17 to the frontmost portion of the second end 18 preferably is about 25 feet for the assembly 10 illustrated in FIG. 2. However it could be a greater amount if only one spiral 11 is provided, or a larger motor, etc., as hereinafter described.

Also associated with the assembly 10 are power means 21 for effecting rotation of the shaft 12 about its axis 13. The power means 21 are mounted directly in association with the spiral conveyor 11 between the first and second ends 17, 18 of the shaft 12. As illustrated most clearly in FIG. 2, the power means 21 preferably are mounted between the top of the leading support strut 15 and an intermediate strut 22, and may comprise a motor 23 (e.g. a 100 horsepower motor) which drives gear means 24, such as conventional planetary gears, and which in turn are connected through a power divider 25 to a chain 26 mounted in a chain case 27, the chain 26 (see FIG. 1) extending between a sprocket 29 of the power divider 25, and a sprocket 30 on the shaft 12. The motor 23 rotates the spiral 11 in the direction 31 illustrated in FIG. 1, to effect conveyance of coal, or other mined material, in the direction of arrow 32 in FIG. 2.

In the preferred embodiment illustrated in FIG. 1, two spiral conveyors are provided. The components of the second spiral conveyor 111 are illustrated by the same reference numerals as the first conveyor 11, only each two digit reference numeral is preceded by a "1". The support struts 15, 16 are common to the spiral shafts 12, 112, with the same motor 23, planetary gears 24, and power divider 25 powering both shafts 12, 112. The motor 23, through the appropriate gearing, rotates the second spiral 111 in the direction 131 (see FIG. 2), opposite to the direction 31, so that each tangential point of each spiral 11, 111 moves toward the other spiral during conveyance, all of the mined material being moved in the direction 32.

The leading shaft ends 17, 117 of the firstmost conveyor section 10 are preferably connected up to a conventional mining head or heads 35, 36, which may have the configuration as illustrated in U.S. Pat. No. 4,082,362, or any other desired configuration. While it is preferred that the assemblies 10 connected up to the heads 35, 36 be identical, in some circumstances, depending upon the material to be mined, the length of each section 10, and the power of each motor 23, it is not necessary to provide the power means 21 associated with each section 10, but rather it may be provided with every other section, every third section, or the like, i.e. disposed at periodic intervals along the spiral conveyor means. It is preferred that the shaft 12, or shafts 12, 112 combined, have a length less than about 100 feet per 100 horsepower of the power means 21, and preferably about two horsepower of power assist for each foot of spiral screw 11, 111 is provided, as in the FIGS. 1 and 2 embodiment. Of course this will also depend upon spiral diameter and other placement. For the exemplary embodiment illustrated in the drawings, each spiral 11, 111 has a diameter of about 32 inches to three feet, and the spacing from the furthestmost side portions of the spirals 11, 111 is about nine feet.

Various accessory structures may also be provided. For example in the embodiment illustrated it is preferred to provide guards 40, 41 which are mounted to the support struts 15, 16, extending the length of the spirals 11, 111, and also support the intermediate strut 22. The guards 40, 41 serve to prevent any mined material from being flung inwardly to such an extent that it damages the power means 21, or adversely impacts upon the operation of the other spiral 11, 111. The sides, bottom, and top of the bore into which the assembly 10, as part of a mining machine, is inserted adequately contain the mined material at the other portions of the travel of the conveyors 11, 111. Also, skids or wheels for mounting the sections, or the like, such as shown in U.S. Pat. No. 4,082,362, may be provided. For example see skids 45, 46 in FIGS. 1 and 2, which engage both the bottom and upper side of a bore at the front and rear supports 15, 16 of the machine 10. Other components may be provided such as any conventional sumping means, or any accessory conveyors either at the bore mouth, or inwardly of the bore mouth taking up where the spiral conveyors 11, 111 leave off. Also, more than two spiral sections 11, 111 may be associated with a single power means 21 if desired.

Figure 3:
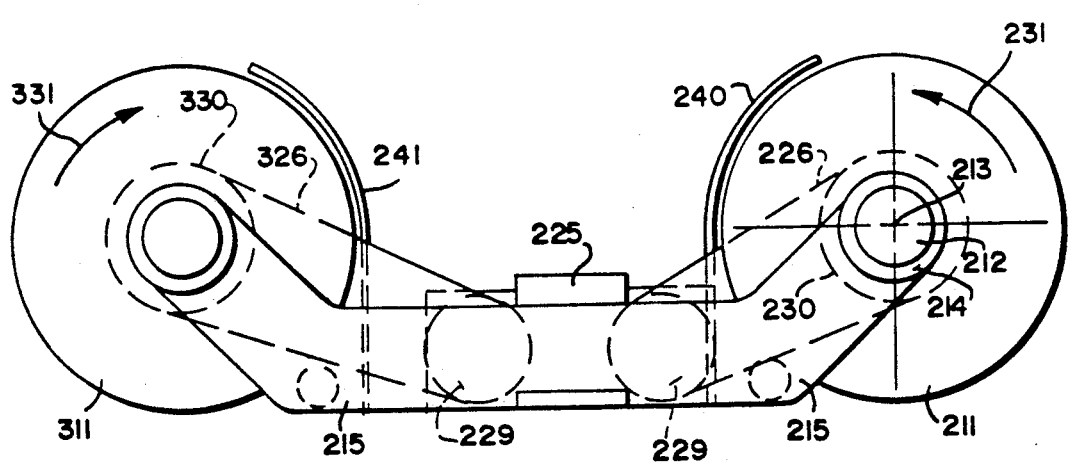
FIG. 3 is a front schematic of another form of exemplary spiral conveyor according to the invention.

FIG. 3 illustrates in front view another embodiment of a machine 10 according to the invention. In this embodiment, the supports are provided at the bottom rather than the top, and skids are not utilized, otherwise it is substantially the same as that in the FIGS. 1 and 2 embodiment. In this embodiment structures comparable to those in the FIGS. 1 and 3 embodiment are shown by the same two digit reference numeral only preceded by a "2", and structures comparable to those in the FIGS. 1 and 2 embodiment having a three digit number are illustrated by the same two digit portion thereof with a preceding "3".

Operation

Utilizing assemblies 10 according to the present invention, in association with a head or heads 35, 36, in a mine having a mine mouth, a method of mining is provided. The method comprises the steps of inserting the mining head 35, 36 into the mine through the mine mouth, and advancing the head into the mine mouth; continuously conveying mined material from the cutting site toward the mine mouth using the spiral conveyor 11 (and/or 111); adding incremental lengths to the spiral conveyor screw 11 (and/or 111), by adding assemblies 10, as the distance from the mining head 35 to the mine mouth increases; and periodically providing power assists 21 for effecting powered rotation of the spiral screw 11 (and/or 111) about its axis of rotation 13 along the length of the spiral conveyor 11 in the mine as the incremental length assemblies 10 are added. Preferably steps are practiced so that there is at least about one-quarter horsepower (e.g. $\frac{1}{4}$-$\frac{3}{4}$ horsepower) of power assist for each foot of spiral screw 11 (of 32-36" diameter), and more preferably about two horsepower of power assist for each foot of spiral screw (for an approximately 32 inch-three foot diameter screw).

In the embodiment illustrated in FIGS. 1 and 2 of the drawings, preferably both screws 11, 111 are rotated at the same time by the power means 21, in opposite directions as illustrated by arrows 31, 131 in FIG. 1, toward each other. Flinging of mined material toward the power means 21, or the other spiral 11, 111, is prevented by the guard means 40, 41. Utilizing the invention it is possible to convey mined material (e.g. coal) from a cutting side at a mining head 35, 36 upon to 1,000 feet or more, something heretofore not possible utilizing spiral conveyors.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A spiral conveyor section assembly for a mining machine, comprising:
    a spiral conveyor;
    a shaft mounting said spiral conveyor for rotation about an axis, said shaft having first and second free ends, each end connectable to another shaft; and
    power means for effecting rotation of said shaft about said axis of rotation mounted directly in association with said spiral conveyor between said first and second ends of said shaft.

2. An assembly as recited in claim 1 wherein said power means has at least $\frac{1}{4}$ horsepower for each foot of spiral conveyor, of diameter about 32-36 inches, powered thereby.

3. An assembly as recited in claim 2 wherein said power means comprises a motor, and gear means operatively connecting said motor to said shaft, and a chain connected between said shaft and said gear means.

4. An assembly as recited in claim 1 wherein said spiral conveyor and shaft comprise a first spiral and shaft rotatable about a first axis, and further comprising a second spiral conveyor and shaft rotatable about a second axis, said second spiral and shaft disposed parallel to said first spiral and shaft, and said power means for rotating both shafts about said first and second axes, respectively.

5. An assembly as recited in claim 4 wherein said power means comprises a motor and gear means operatively connecting said motor to both of said shafts.

6. An assembly as recited in claim 5 wherein said power means further comprises a chain connected between said gear means and each of said shafts.

7. An assembly as recited in claim 5 wherein said gear means comprises a planetary gear train connected to said motor, and a power divider connected to said planetary gear train.

8. An assembly as recited in claim 5 wherein said motor and gear means rotate said shafts in opposite directions, toward each other, and further comprising guard means preventing inward flinging of mined material.

9. An assembly as recited in claim 4 further comprising support struts operatively extending between said shafts and providing bearing means for mounting said shafts for rotation about their axes of rotation, and skids mounted to said support struts.

10. An assembly as recited in claim 1 wherein said first free end of said shaft comprises means defining an axially extending non-round opening for receipt of a correspondingly shaped non-round shaft section from another spiral conveyor shaft; and said second free end of said shaft comprises a non-round shaft section.

11. A method of mining a mine having a mine mouth, using a mining head with a spiral conveyor including a spiral conveyor screw rotatable with a shaft about an axis of rotation, comprising the steps of:
   (a) inserting the mining head into the mine through the mine mouth, and advancing the head into the mine mouth;
   (b) continuously conveying mined material from the mine toward the mine mouth using the spiral conveyor;
   (c) adding incremental lengths to the spiral conveyor screw as the distance from the mining head to the mouth increases; and
   (d) periodically providing power assists for effecting powered rotation of the spiral conveyor about its axis of rotation along the length of the spiral conveyor in the mine as the incremental lengths are added.

12. A method as recited in claim 11 wherein step (d) is practiced so that there is at least about one-quarter horsepower of power assist for each foot of spiral conveyor of about 32-36 inches in diameter.

13. A method as recited in claim 11 wherein step (d) is practiced so that there are proportionally, about $\frac{1}{4}$-2 horsepower of power assist for each foot of spiral conveyor of about 32 inches to three feet in diameter.

14. A method as recited in claim 11 wherein steps (a)-(d) are practiced to convey mined material utilizing the spiral conveyor about 1,000 feet or more.

15. A method as recited in claim 11 wherein the spiral conveyor comprises two parallel spiral screws rotatable with parallel shafts horizontally spaced from each other, and wherein step (d) is practiced by rotating the spiral screws in opposite directions, toward each other.

16. A method as recited in claim 11 wherein each shaft has a non-round cross-sectional second end, and a first end having a recess with a cross-sectional configuration comparable to the non-round cross-section of the second end of the shaft, so that step (c) is practiced by inserting the second ends of one shaft into the first end recess of a trailing spiral conveyor shaft.

17. A mining machine for mining a mine having a mine mouth, and comprising:
   a mining head;
   spiral conveyor means extending from said mining head toward the mine mouth;
   said spiral conveyor means comprising at least one spiral conveyor screw and shaft rotatable about an axis, and mounting said spiral; and
   power means disposed at periodic intervals along said conveyor means for providing power for rotating said shaft about said axis, so that said conveyor means may extend about 1000 feet or more from said mining head to said mine mouth, and still be effectively powered.

18. A mining machine as recited in claim 17 wherein said spiral conveyor means comprises a first spiral and shaft rotatable about a first axis, and a second spiral conveyor and shaft rotatable about a second axis, said second spiral and shaft disposed parallel to said first spiral and shaft; said power means rotating both shafts, about said first and second axes respectively.

19. An assembly as recited in claim 18 wherein said power means effect rotation of said shafts in opposite directions, so that tangential portions of said spirals rotate toward each other; and further comprising guard means for preventing mined material from being flung from one spiral to the power means, or the other spiral.

20. A mining machine as recited in claim 17 further comprising a pair of support struts provided at spaced locations along the length of said shaft and comprising bearing means for mounting said shaft for rotation and having skids associated therewith; and wherein said power means are also operatively mounted to at least one of said support struts.

* * * * *